(12) United States Patent
Das et al.

(10) Patent No.: US 12,499,143 B2
(45) Date of Patent: Dec. 16, 2025

(54) QUERY RESPONSE GENERATION USING STRUCTURED AND UNSTRUCTURED DATA FOR CONVERSATIONAL AI SYSTEMS AND APPLICATIONS

(71) Applicant: NVIDIA Corporation, Santa Clara, CA (US)

(72) Inventors: Shubhadeep Das, West Bengal (IN); Sumit Kumar Bhattacharya, Maharashtra (IN); Oluwatobi Olabiyi, Falls Church, VA (US)

(73) Assignee: NVIDIA Corporation, Santa Clara, CA (US)

( * ) Notice: Subject to any disclaimer, the term of this patent is extended or adjusted under 35 U.S.C. 154(b) by 9 days.

(21) Appl. No.: 18/172,571

(22) Filed: Feb. 22, 2023

(65) Prior Publication Data

US 2024/0176808 A1  May 30, 2024

Related U.S. Application Data

(60) Provisional application No. 63/428,843, filed on Nov. 30, 2022.

(51) Int. Cl.
*G06F 16/334* (2025.01)
*G06F 16/338* (2019.01)

(52) U.S. Cl.
CPC ........ *G06F 16/3344* (2019.01); *G06F 16/338* (2019.01)

(58) Field of Classification Search
CPC .......................... G06F 16/3344; G06F 16/338
See application file for complete search history.

(56) References Cited

U.S. PATENT DOCUMENTS

| | | | |
|---|---|---|---|
| 11,474,519 B2 | 10/2022 | Hicok et al. | |
| 11,822,888 B2 * | 11/2023 | Beaver | G06F 40/274 |
| 2019/0265703 A1 | 8/2019 | Hicok et al. | |
| 2020/0364303 A1 | 11/2020 | Liu et al. | |
| 2022/0026987 A1 | 1/2022 | Hu et al. | |
| 2023/0236857 A1 * | 7/2023 | Ferrucci | G06F 40/205 707/723 |
| 2023/0351111 A1 * | 11/2023 | Fauqueur | G06F 16/367 |

* cited by examiner

*Primary Examiner* — Tyler J Torgrimson
(74) *Attorney, Agent, or Firm* — Iron Summit IP LLP

(57) ABSTRACT

In various examples, contextual data may be generated using structured and unstructured data for conversational AI systems and applications. Systems and methods are disclosed that use structured data (converted to unstructured form) and unstructured data, such as from a knowledge database(s), to generate contextual data. For instance, the contextual data may represent text (e.g., narratives), where a first portion of the text is generated using the structured data and a second portion of the text is generated using the unstructured data. The systems and methods may then use a neural network(s), such as a neural network(s) associated with a dialogue manager, to process input data representing a request (e.g., a query) and the contextual data in order to generate a response to the request. For instance, if the request includes a query for information associated with a topic, the neural network(s) may generate a response that includes the requested information.

20 Claims, 12 Drawing Sheets

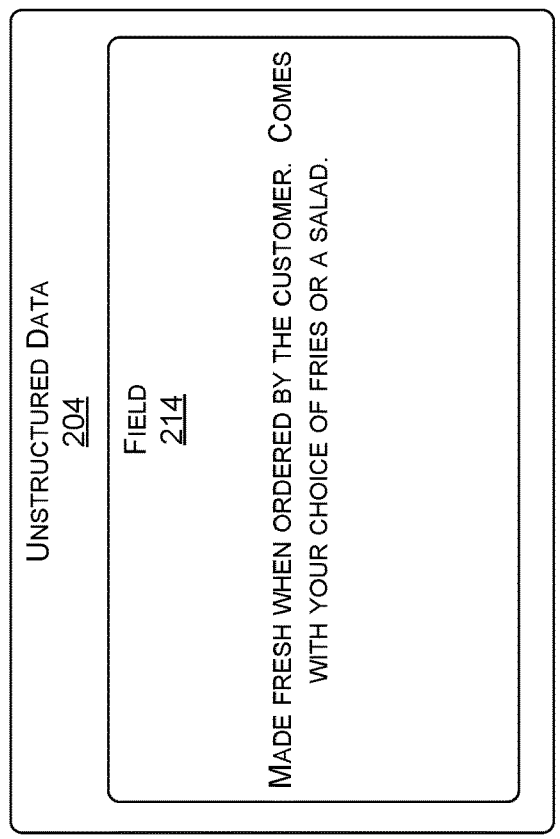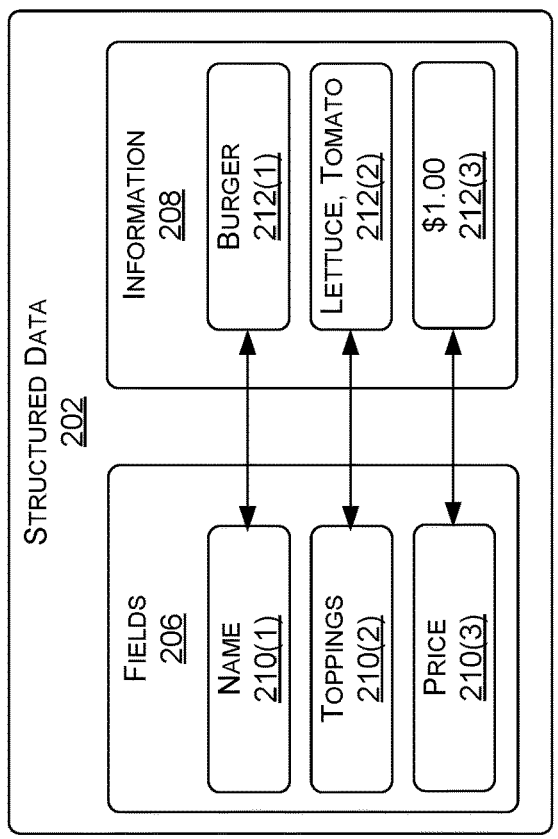
FIGURE 2

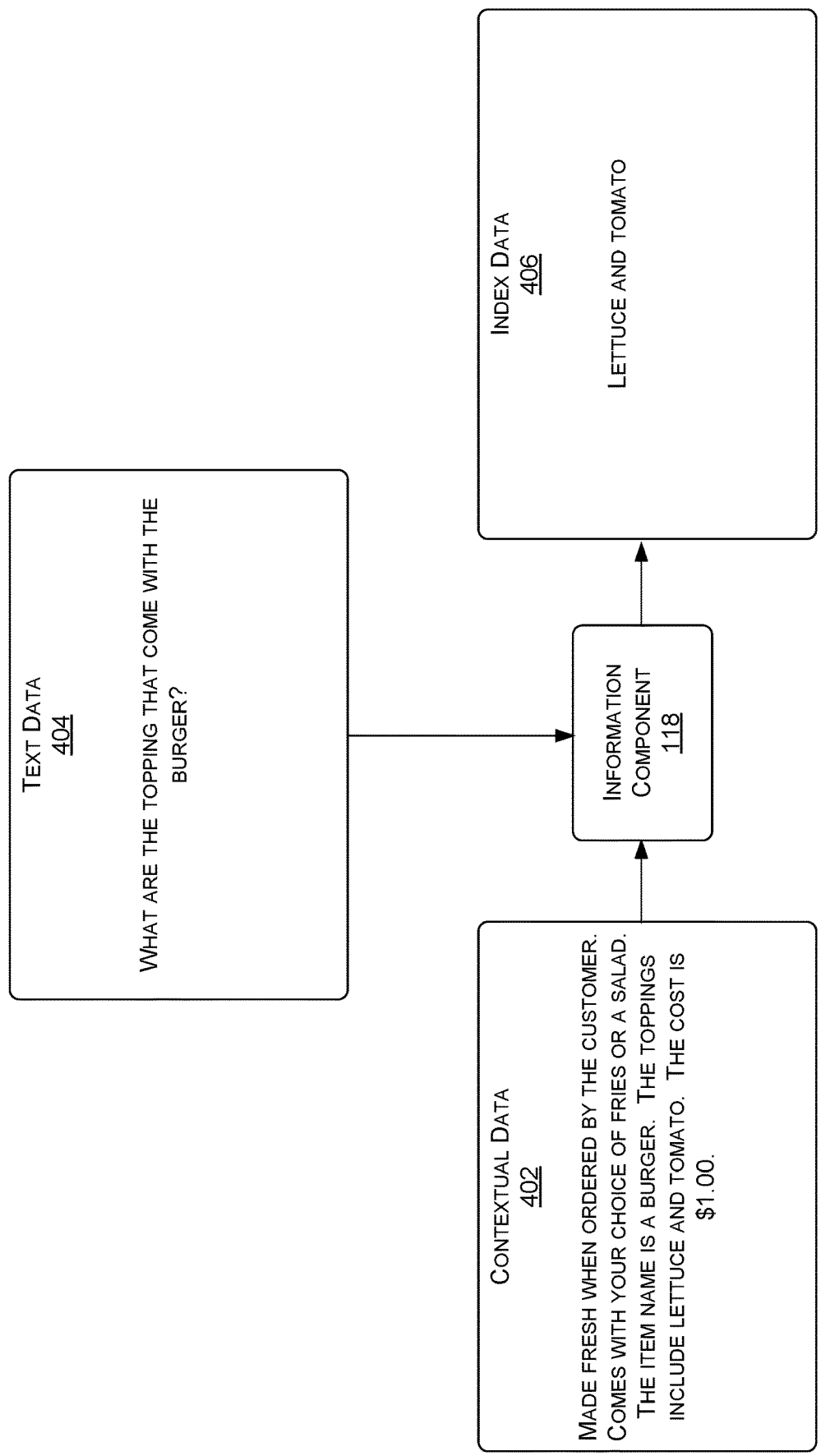

QUERY RESPONSE GENERATION USING STRUCTURED AND UNSTRUCTURED DATA FOR CONVERSATIONAL AI SYSTEMS AND APPLICATIONS

CROSS-REFERENCE TO RELATED APPLICATIONS

This application claims the benefit of U.S. Provisional Application No. 63/428,843, filed on Nov. 30, 2022, which is hereby incorporated by reference in its entirety.

BACKGROUND

Dialogue systems are used in many different applications, such as applications for requesting information (e.g., information about objects, features, etc.), scheduling travel plans (e.g., booking arrangements for transportation and accommodations etc.), planning activities (e.g., making reservations, etc.), communicating with others (e.g., make phone calls, start video conferences, etc.), shopping for items (e.g., purchase items from online marketplaces, order food from a local restaurant, etc.), and/or so forth. Some dialogue systems operate by receiving text-such as text including one or more letters, words, numbers, and/or symbols—that is generated using an input device and/or generated as a transcript of spoken language. In some circumstances, the text may represent a request, such as—in a restaurant or food-ordering scenario—a request to inquire about food items provided by a restaurant and/or a request to order one or more of the food items offered by the restaurant. The dialogue systems then process the text using a dialogue manager that is trained to interpret the text. For instance, based on interpreting the text, the dialogue manager may generate a response, such as a response to a query associated with the foot items.

For instance, the dialogue manager may analyze the request in order to determine an intent associated with the request and slots associated with the intent. The dialogue manager may then use a knowledge database to determine information associated with request based on the intent and the slots. In some circumstances, knowledge databases may include structured data, such as structured data representing fields that associate specific identifiers with information (e.g., the information is paired with the specific identifiers). Additionally, or alternatively, in some circumstances, knowledge databases may include unstructured data, such as unstructured data representing fields that describe topics using plaintext descriptions and/or narratives. However, problems may occur when the same knowledge database includes both structured data and unstructured data. For example, it may be difficult for the dialogue manager to identify the information needed for the request since the information is represented differently using the structured data and the unstructured data.

Additionally, such as when using knowledge databases that include structured data, training a neural network(s) used by dialogue managers to generate responses may require a large amount of training data. For instance, and as described above, the structured data may represent fields that associate specific identifiers with information. As such, to train the neural network(s), training data that represents samples for each of the identifiers may be required such that the neural network(s) is then able to interpret requests associated with the identifiers. This may increase the amount of computing resources and/or time that is required to train the neural network(s).

SUMMARY

Embodiments of the present disclosure relate to generating query responses using combined structured and unstructured data for conversational AI systems and applications. Systems and methods are disclosed that use both structured data (converted to an unstructured form, in embodiments) and unstructured data, such as from a knowledge database(s), to generate contextual data. For instance, the contextual data may represent text (e.g., narratives), where at least a first portion of the text (e.g., in unstructured form, in embodiments) is generated using the structured data and at least a second portion of the text is generated using the unstructured data. The systems and methods may then use a neural network(s), such as a neural network(s) associated with a dialogue manager, to process input data representing a request (e.g., a query) and the contextual data in order to generate a response to the request. For instance, if the request includes a query for information associated with a topic, the neural network(s) may generate a response that includes the requested information.

In contrast to conventional systems, such as those described above, the current systems, in some embodiments, are able to generate responses to requests using both structured data and unstructured data. As described herein, the current systems may be able to generate the responses by generating, using both the structured data and the unstructured data, the contextual data representing the text that includes at least a portion of the text represented by the structured data and at least a portion of the text represented by the unstructured data. Additionally, in contrast to the conventional systems, the current systems, in some embodiments, are able to generate the responses using the neural network(s) that may not be trained for each of the fields represented by the structured data. Rather, the neural network(s) may be trained using unstructured training data that is similar to the contextual data (e.g., generated in unstructured form using both unstructured and structured data) later processed by the neural network(s), which may require less training data, computing resources, and/or time for the training.

BRIEF DESCRIPTION OF THE DRAWINGS

The present systems and methods for generating query responses using structured and unstructured data for conversational AI systems and applications are described in detail below with reference to the attached drawing figures, wherein:

FIG. 2 illustrates an example of structured data and unstructured data, in accordance with some embodiments of the present disclosure;

FIG. 4 illustrates an example of using contextual data to extract information that is associated with a request, in accordance with some embodiments of the present disclosure;

DETAILED DESCRIPTION

Figure 1:
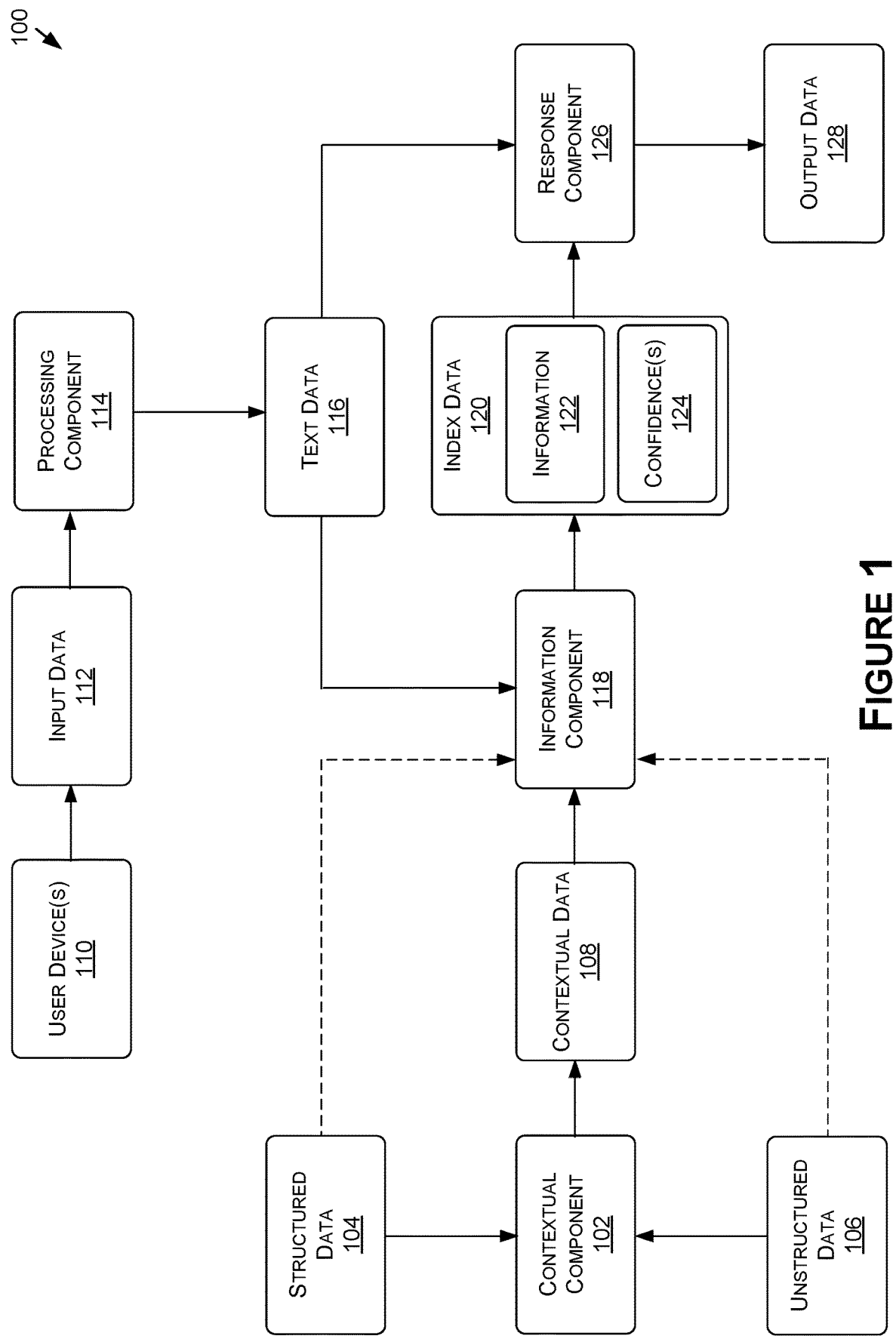
FIG. 1 is an example data flow diagram for a process of processing contextual data, which is generated using structured and unstructured data, in order to determine responses to requests or queries, in accordance with some embodiments of the present disclosure.

Systems and methods are disclosed related to generating contextual data using structured and unstructured data for conversational AI systems and applications. For instance, a system(s) stores—such as in a knowledge database(s)—structured data representing structured text associated with an intent, topic, action, and/or the like, and unstructured data representing unstructured text associated with the intent, topic, action, and/or the like. As described herein, the structured text may include fields that associate (e.g., pair) identifiers with information (e.g., key: value pairs). For example, and for a food item, the structured text may include a first field that associates a name identifier (e.g., a key) with information describing the name (e.g., a value), a second field that associates a size identifier with a size of the food item, a third field that associates a calorie identifier with a calorie number associated with the food item, a fourth field that associates a price identifier with a price of the food item, and/or so forth. Additionally, the unstructured data may represent one or more fields that include one or more plaintext descriptions, such as information that is not associated with a specific identifier. For example, and again for the food item, the unstructured text may include a description of how the food item is created (e.g., mixed, cooked, baked, rested, etc.).

The system(s) may then use the structured data and the unstructured data to generate contextual data representing text associated with the intent, topic, action, and/or the like. For instance, in some examples, the system(s) may use the structured data to generate one or more narratives associated with the one or more fields, such that an individual narrative is generated as a plaintext description that includes at least an identifier and information associated with the identifier. The system(s) may also use the unstructured data to generate one or more narratives associated with the one or more fields, such that an individual narrative is generated as a plaintext description associated with one of the fields of the unstructured data. Additionally, the system(s) may then generate the contextual data using the narratives. For instance, and in some examples, the system(s) may generate the contextual data to represent text in the form of a paragraph using the narratives.

The system(s) may then receive and/or generate input data representing a request, such as input data representing text including one or more letters, words, sub-words, numbers, and/or symbols. For a first example, the system(s) may receive, from a user device, audio data representing user speech and then process the audio data to generate the input data. For a second example, the system(s) may receive, from a user device, the input data representing the request. In any of these examples, the request may include a query for information associated with a topic (e.g., an object, item, feature, attribute, characteristic, etc.), a request to perform an action associated with a topic (e.g., schedule a dinner reservation, book a trip, generate a list, provide content, etc.), and/or any other type of request. The system(s) may then process the input data, using the neural network(s), in order to generate a response to the request.

For instance, the system(s) may input, into the neural network(s), the input data along with the contextual data. In some examples, in addition to or alternatively from inputting the input data, the system(s) may pre-process the input data in order to determine and intent and/or one or more slots associated with the input data. In such examples, the system(s) may input data representing the intent and/or the slot(s) into the neural network(s). The neural network(s) may then process the input data and the context data in order to generate a response associated with the request. For example, a first neural network(s) may initially process the input data and the context data to generate index data representing one or more words associated with the request, where the first neural network(s) may determine the one or more words from the contextual data. A second neural network(s) may then process the input data and the index data in order to generate response data representing the response. The system(s) may then provide the response, such as by sending the response data to the user device.

In some examples, the neural network(s) used by the system(s) may include a similar neural network(s) that systems use to process structured data and/or a similar neural network(s) that systems use to process unstructured data. As such, the system(s) may not need to train a new neural network(s) to perform the processes described herein (e.g., to process the contextual data). For example, because a neural network(s) may be trained to process unstructured data, and the structured data may be converted into unstructured form, the neural network(s) may be configured to process this unstructured data without any additional training. However, in some examples, the system(s) may train a neural network(s) to perform the processes described herein, such as by using training data that is similar to the contextual data input into the neural network(s) during deployment. In either of these examples, the system(s) may be able to generate responses to requests using a knowledge base that includes both structured data and unstructured data.

The systems and methods described herein may be used for a variety of purposes, by way of example and without limitation, for use in systems associated with machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, digital avatars, light transport simulation (e.g., ray-tracing, path tracing, etc.), collaborative content creation for 3D assets, cloud computing, and/or any other suitable applications.

Disclosed embodiments may be comprised in a variety of different systems such as automotive systems (e.g., a chat bot, digital avatar, or conversation AI component of an in-vehicle-infotainment (IVI) system for an autonomous, non-autonomous, or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for generating, presenting, or rendering a digital avatar, systems for performing light transport simulation, systems for performing collaborative content creation for 3D assets, systems implemented at least partially using cloud computing resources, and/or other types of systems.

With reference to FIG. 1, FIG. 1 is an example data flow diagram for a process 100 of processing contextual data, which is generated using structured and unstructured data, in order to determine responses to requests, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include a contextual component 102 that receives structured data 104 and unstructured data 106, such as from a knowledge database(s). The structured data 104 may represent text associated with an intent, topic, action, and/or the like that is in a structured format and unstructured data 106 representing text associated with the intent, topic, action, and/or so like that is in an unstructured format. For example, the text represented by the structured data 104 may include fields that associate (e.g., pair) identifiers with information. For example, and for a topic, the text represented by the structured data 104 may include a first field that associates a first identifier with first information describing the first identifier, a second field that associates a second identifier with second information describing the second identifier, a third field that associates a third identifier with third information describing the third identifier, and/or so forth. Additionally, the text represented by the unstructured text 106 may include one or more fields that include one or more plaintext descriptions, such as information that is not associated with a specific identifier(s) and/or drafted as a narrative.

For instance, FIG. 2 illustrates an example of structured data 202 (which may represent, and/or include, the structured data 104) and unstructured data 204 (which may represent, and/or include, the unstructured data 106), in accordance with some embodiments of the present disclosure. In the example of FIG. 2, the structured data 202 and the unstructured data 204 may be associated with a specific topic, such as a specific food item (e.g., burgers). However, in other examples, the structured data 202 and/or the unstructured data 204 may be associated with an intent, another topic, an action, and/or the like.

As shown, the structured data 202 may represent at least fields 206 and information 208 associated with (e.g., paired with) the fields 206. In the example of FIG. 2, the fields 206 include three different identifiers 210(1)-(3) (also referred to singularly as "identifier 210" or in plural as "identifiers 210"), such as a name identifier 210(1), a toppings identifier 210(2), and a price identifier 210(3). Additionally, the information 208 includes respective information 212(1)-(3) for each of the fields 206, such as "burger" information 212(1) associated with the name identifier 210(1), "lettuce, tomato" information 212(2) associated with the toppings identifier 210(2), and "$1.00" information 212(3) associated with the price identifier 210(3). By using this structured format, a system(s) may be able to use the associations (e.g., the pairs) to identify the information 208 for each of the identifiers 210.

In the example of FIG. 2, the unstructured data 204 includes a single field 214 that includes a description associated with the topic. As shown, unlike the structured data 202, the unstructured data 204 does not associate identifiers 210 from the fields 206 with information 208. Rather, the field 214 includes a plaintext description and/or narrative associated with the topic. While the example of FIG. 2 illustrates the structured data 202 as including three fields 206 and the unstructured data 204 as including one field 214, in other examples, the structured data 202 and/or the unstructured data 204 may be associated with any number of fields.

In some examples, the contextual component 102 may be configured to pull at least the information 208 from one or more databases. For instance, the contextual component 102 may use one or more application programming interfaces (APIs) to pull the information 208 from the database(s), where the information 208 is associated with the fields 206. For example, when the contextual component 102 receives a request associated with the information 208 for the fields, the APIs may be configured to access the database(s) in order to pull the information 208. This way, even if the information 208 is updated, the APIs still pull the updated information 208 from the database(s).

Referring back to the example of FIG. 1, the process 100 may include the contextual component 102 using the structured data 104 and the unstructured data 106 to generate contextual data 108 representing text associated with the intent, topic, action, and/or the like. For instance, the contextual component 102 may use the structured data 104 to generate a first portion of the text. In some examples, the contextual component 102 generates the first portion of the text (e.g., in unstructured form) using one or more first narratives associated with one or more of the fields of the structured data 104. For example, a respective narrative may include text, where the text includes at least an identifier associated with a field, information associated with the identifier, and one or more words that provide context to the narrative (and/or that convert the structured data to a more natural sentence form, which may be similar to the form or format of the unstructured data). For example, where the structured data includes a key: value pair, the key and the value may be included in the narrative, along with one or more additional words, symbols, etc. that convert the key: value pair into a narrative. The contextual component 102 may also use the unstructured data 106 to generate a second portion of the text. In some examples, the contextual component 102 generates the second portion of the text using one or more second narratives associated with one or more of the fields of the unstructured data 106. For example, a respective narrative may include the plaintext description associated with a field. The contextual component 102 may then generate the contextual data 108 using the narratives.

Figure 3A:
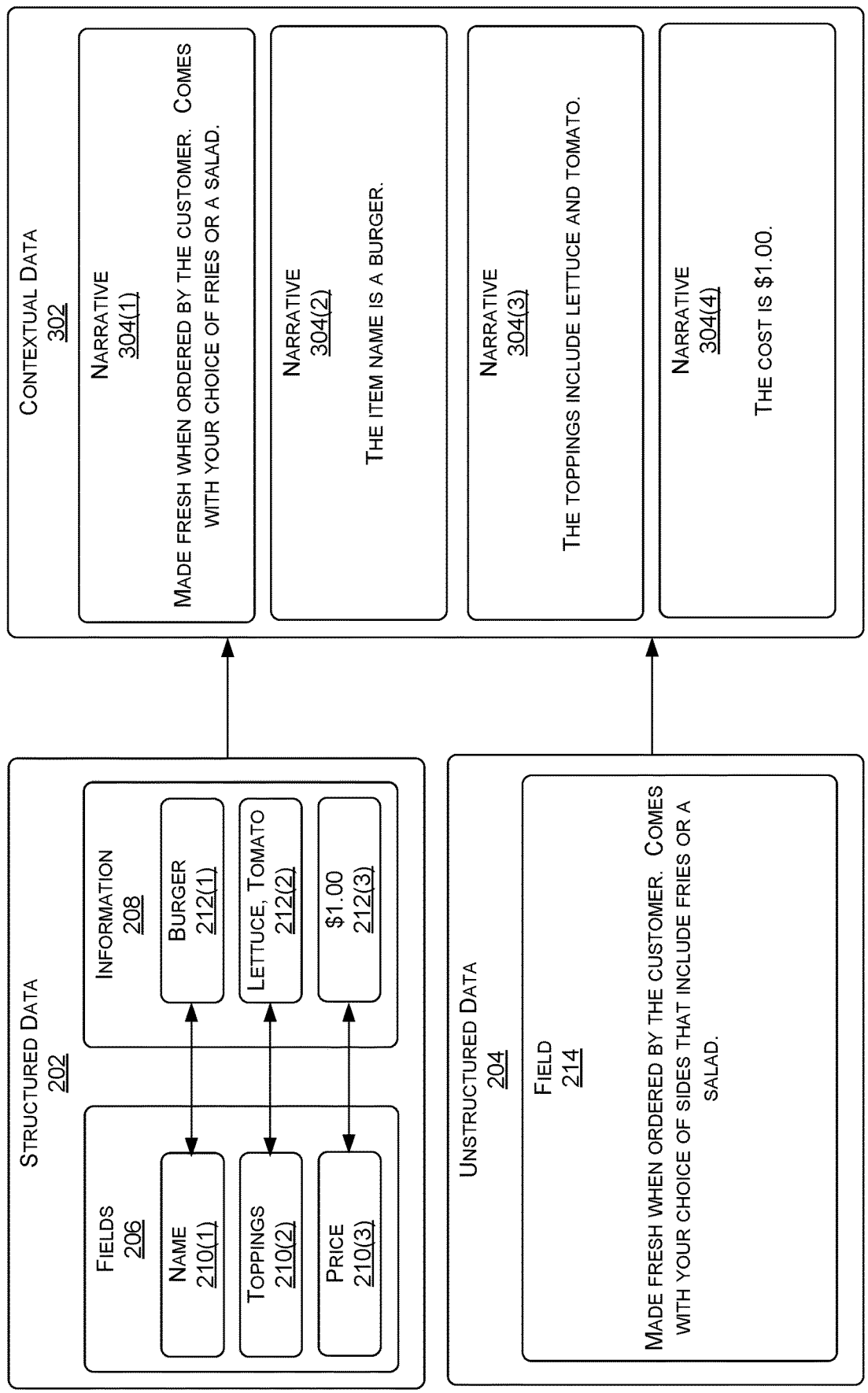
FIGS. 3A-3B illustrate examples of using structured data and unstructured data to generate contextual data, in accordance with some embodiments of the present disclosure.

For instance, FIG. 3A illustrates a first example of using the structured data 202 and unstructured data 204 to generate contextual data 302 (which may represent, and/or include, the contextual data 108), in accordance with some embodiments of the present disclosure. As shown, the contextual data 302 may be generated using narratives 304(1)-(4) (also referred to singularly as "narrative 304" or in plural as "narratives 304"). For instance, the first narrative 304(1) of the contextual data 302 includes the text that is associated with the field 214 from the unstructured data 204. While the example of FIG. 3A illustrates the text of the first narrative 304(1) matching the text from the field 214, in other examples, the text of the first narrative 304(1) may include less text, more text, and/or different text from the text from the field 214. Additionally, while the example of FIG. 3A illustrates the contextual data 302 as only including the single narrative 304(1) associated with the unstructured data 204, in other examples, the contextual data 302 may include additional narratives associated with additional fields of the unstructured data 204.

The contextual data 302 further includes narratives 304(2)-(4) associated with the fields 206 of the structured data 202. As shown, the second narrative 304(2) may be generated using the identifier 210(1) from the fields 206 and the information 212(1) associated with the identifier 210(1), the third narrative 304(3) may be generated using the identifier 210(2) from the fields 206 and the information 212(2) associated with the identifier 210(2), and the fourth narrative 304(4) may be generated using the identifier 210(3) from the fields 206 and the information 212(3) associated with the identifier 210(3). In the example of FIG. 3A, the narratives 304(2)-(4) are further generated by including additional text such that the narratives 304(2)-(4) include a similar format as the first narrative 304(1). For examples, the narratives 304(2)-(4) are plaintext descriptions that include the identifies from the fields 206 and the information 208. While the example of FIG. 3A illustrates the contextual data 302 as only including the three narratives 304(2)-(4) associated with the structured data 202, in other examples, the contextual data 302 may include any number of narratives associated with any number of fields of the structured data 202.

Figure 3B:
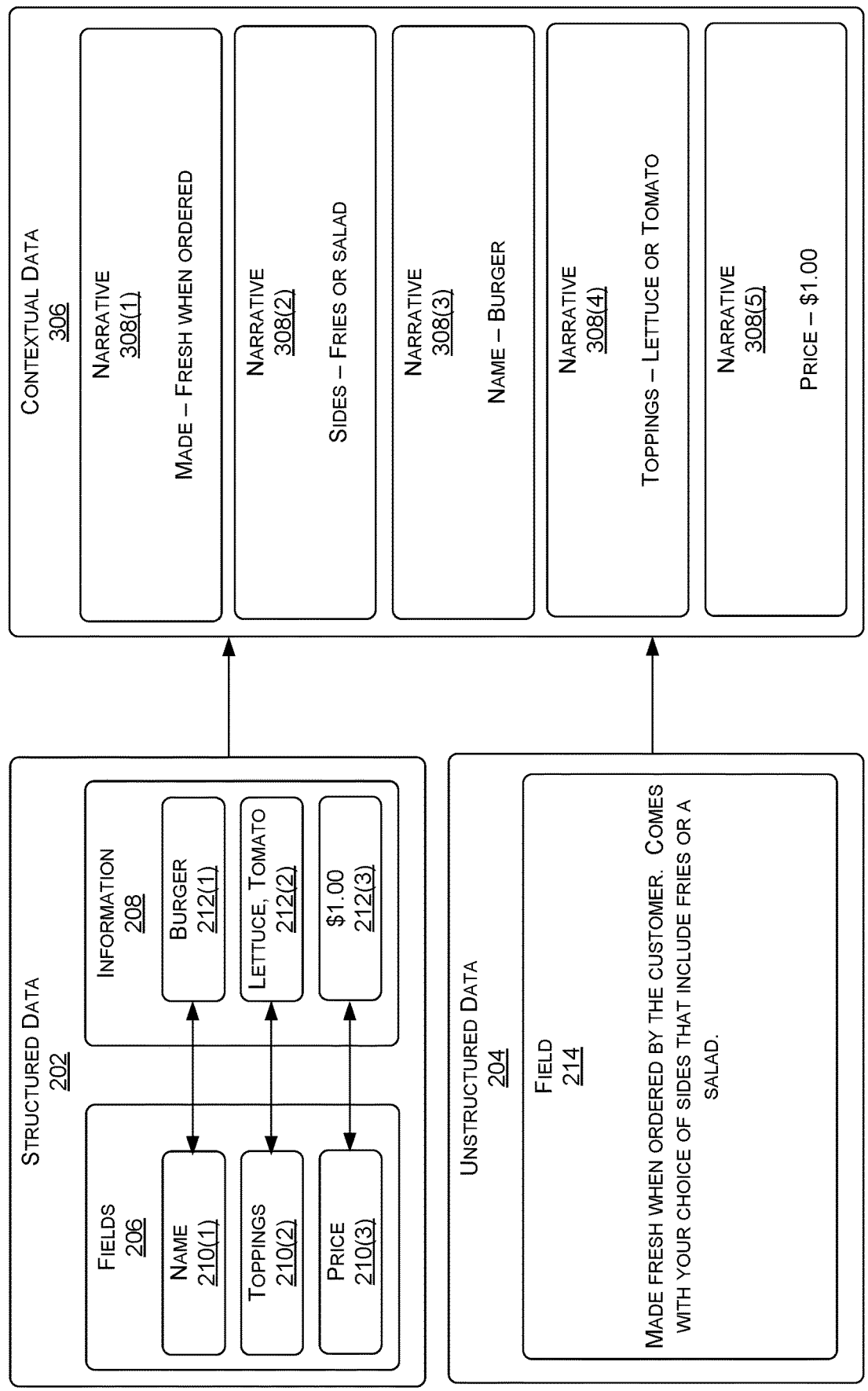

Additionally, while the example of FIG. 3A illustrates the contextual component 102 as generating the narratives 304(2)-(4) by converting the structured data 202 into a format that is similar to the unstructured data 204, in other examples, the contextual component 102 may additionally, or alternatively, generate the narrative 304(1) by converting the unstructured data 204 into a format that is similar to the structured data 202. For instance, FIG. 3B illustrates a second example of using the structured data 202 and unstructured data 204 to generate contextual data 306 (which may represent, and/or include, the contextual data 108), in accordance with some embodiments of the present disclosure. As shown, the contextual data 306 may be generated using narratives 308(1)-(5) (also referred to singularly as "narrative 308" or in plural as "narratives 308").

For instance, and as shown by the example of FIG. 3B, the contextual component 102 may determine one or more words from the text of the unstructured data 204 to use as one or more identifiers. The contextual component 102 may then associate (e.g., pair) the one or more identifiers with information from the text. For a first example, the contextual component 102 may determine that the word "made" from the description associated with the field 214 is an identifier and then associated the identifier with the information "fresh when ordered." As such, a first narrative 308(1) of the contextual data 306 associates the identifier "made" with the information "fresh when ordered." For a second example, the contextual component 102 may determine that the word "sides" from the description associated with the field 214 is an identifier and then associate the identifier with the information "fries or a salad." As such, a second narrative 308(2) of the contextual data 306 associates the identifier "sides" with the information "fries or salad."

As further illustrated in the example of FIG. 3B, the contextual component 102 further generates narratives 308(3)-(5) using the structured data 202. For instance, a third narrative 308(3) associates the identifier "name" with the information "burger," a fourth narrative 308(4) associates the identifier "toppings" with the information "lettuce or tomato," and a fifth narrative 308(5) associates the identifier "price" with the information "$1.00." While the examples of FIGS. 3A-3B illustrate two techniques for generating contextual data 302 and 306 using the structured data 202 and the unstructured data 204, in other examples, the contextual component 102 may perform additional and/or alternative techniques to generate contextual data using the structured data 202 and the unstructured data 204.

Referring back to the example of FIG. 1, the process 100 may include a user device(s) 110 providing input data 112. In some examples, the input data 112 may include audio data generated (e.g., using a microphone(s)) and/or sent by the user device 110, where the audio data represent user speech from one or more users. Additionally, or alternatively, in some examples, the input data 112 may include text data generated (e.g., using a keyboard, touchscreen, and/or other input device) and/or sent by the user device 110, where the text data represents one or more letters, words, numbers, and/or symbols. While these are just a couple example types of data that the input data 112 may include, in other examples, the input data 112 may include any other type of data.

The process 100 may include a processing component 114 that is configured to process the input data 112 in order to generate text data 116. For a first example, such as when the input data 112 includes audio data representing user speech, the processing component 114 may include one or more speech-processing models, such as an automatic speech recognition (ASR) model(s), a speech to text (STT) model(s), a natural language processing (NLP) model(s), a diarization model(s), and/or the like, that is configured to generate the text data 116 associated with the audio data. For instance, the text data 116 may represent a transcript (e.g., one or more letters, words, symbols, numbers, etc.) associated with the user speech. For a second example, such as when the input data 112 includes text data, the process 100 may not include the processing component 114 such that the text data 116 includes the input data 112.

In some examples, the processing component 114 may be configured to perform additional processing. For example, the processing component 114 may process the input data 112 in order to determine an intent and/or one or more slots associated with the input data 112. As described herein, an intent may include, but is not limited to, requesting information (e.g., information about an object, information about a feature, etc.), scheduling an event (e.g., booking arrangements for transportation and accommodations etc.), planning activities (e.g., making reservations, etc.), communicating with others (e.g., make phone calls, start video conferences, etc.), shopping for items (e.g., purchase items from online marketplaces, order food from a local restaurant, etc.), and/or so forth. Additionally, the slot(s) may provide additional information associated with the intent. For example, if the intent is a request for information associated with an object, then a first slot may include an identifier (e.g., a name) of the object and a second slot may include the type of information being requested for the object. In examples where the processing component 114 performs this additional processing, the text data 116 may additionally, and/or alternative, represent the intent and/or the slot(s).

In some examples, the contextual data 108 may be selected based on an intent and/or the information of a slot(s) associated with the intent. For example, if the intent is a request for information associated with an object and information associated with a slot indicates a type of the object, the contextual data 108 may be selected based on the contextual data 108 including information associated with the type of object.

The process 100 may include an information component 118 that is configured to process, such as by using one or more neural networks, the text data 116 and the contextual data 108 in order to identify information (e.g., one or more words) associated with the request represented by the text data 116. For instance, the information component 118 may process the text data 116 in order to determine the intent associated with the request and/or one or more slots associated with the intent. For example, if the request is a query for information associated with an object, then the information component 118 may process the text data 116 in order to determine that the intent is requesting information. The information component 118 may also process the text data 116 to determine that first information for a first slot associated with the intent includes an identifier (e.g., a name) of an object and/or second information for a second slot associated with the intent includes the type of information being requested.

The information component 118 may then process the contextual data 108 to identify a portion of the text (e.g., one or more letters, words, numbers, and/or symbols) associated with the intent and/or the slot(s). In some examples, to identify the portion of the text, the information component 118 may initially identify one or more words within the text represented by the contextual data 108, such as a word(s) that is associated with the intent and/or a slot(s). For example, if the intent includes "requesting information" associated with a food item and a slot includes "toppings," then the information component 118 may initially identify the word "toppings" in the text represented by the contextual data 108. The information component 118 may then identify the portion of the text as one or more letters, words, numbers, and/or symbols using the identified word(s), such as one or more letters, words, numbers, and/or symbols that are located proximate to the identified word(s) within the text. For instance, and using the example above, if the text includes the words "the toppings include lettuce and pickles," then the information component 118 may identify the portion of the text as including "lettuce and pickles" since that portion of the text is after the identified word "toppings." The information component 118 may then generate and output index data 120 representing the portion of the text, which is represented by information 122.

For instance, FIG. 4 illustrates an example of using contextual data to extract information that is associated with a request, in accordance with some embodiments of the present disclosure. For instance, and as shown, the information component 118 may receive contextual data 402 (which may represent, and/or include, the contextual data 108) representing text associated with a topic. In the example of FIG. 4, the contextual data 402 may be generated using the contextual data 302 from the example of FIG. 3A. For instance, the contextual data 402 may be generated by combining the text from the narratives 304, such as in a paragraph form. While the example of FIG. 4 illustrates the contextual data 402 being generated using the text of the narrative 304(1), followed by the text of the narrative 304(2), followed by the text of the narrative 304(3), and finally followed by the text of the narrative 304(4), in other examples, the contextual data 402 may be generated by combining the text from the narratives using a different order.

The information component 118 may further receive text data 404 (which may represent, and/or include, the text data 116) representing a request from a user. In the example of FIG. 4, the request includes a query about the toppings that are provided with the burger. As such, the information component 118 may process, using one or more neural networks, the text data 404 and the contextual data 402 in order to identify at least a portion of the contextual data 402 that is associated with the text data 404. For example, the information component 118 may determine that an intent associated with the query is to "request information," a first slot associated with the query is "burger," and a second slot associated with the query is "toppings." The information component 118 may then use the intent and/or the slots to identify the portion of the contextual data 402.

The information component 118 may then output index data 406 (which may represent, and/or include, the index data 120) representing the portion of the contextual data 402. For instance, and in the example of FIG. 4, the index data 406 represents the portion of the text that includes "lettuce and tomato." As such, the information component 118 may determine that the information being requested by the query is "lettuce and tomato."

Referring back to the example of FIG. 1, in some examples, the information component 118 may output multiple instances of information 122. For example, the information component 118 may output first information 122 representing a first portion of the text represented by the contextual data 108, second information 122 representing a second portion of the text represented by the contextual data 108, third information 122 representing a third portion of the text represented by the contextual data 108, and/or so forth. In some examples, the information component 118 outputs a threshold number of instances of information 122. The threshold number may include, but is not limited to, one instance, two instances, five instances, ten instances, and/or any other number of instances.

In such examples, the information component 118 may also generate a respective confidence 124 for one or more (e.g., each) of the instances. For instance, and using the example above, the information component 118 may output a first confidence 124 associated with the first information 122, a second confidence 124 associated with the second information 122, a third confidence 124 associated with the third information 122, and/or so forth. The information component 118 may then select at least one of the instances using the confidences 124. For example, the information component 118 may select the instance of the information 122 that is associated with the highest confidence 124 from among the confidences 124.

In some examples, the information component 118 may perform additional processes based on the confidence(s) 124. For example, the information component 118 (and/or another component) may determine whether the confidence(s) 124 satisfies (is equal to or greater than) a threshold confidence. The threshold confidence may include, but is not limited to, 25%, 50%, 75%, 90%, 99%, and/or any other threshold. If the information component 118 determines that the confidence(s) 124 satisfies the threshold confidence, then the process 100 may include using the information 122 associated with the confidence(s) 124. However, if the information component 118 determines that the confidence(s) 124 does not satisfy the threshold confidence, then the process 100 may include performing additional processing to identify additional information 122.

For a first example, the information component 118 may process the structured data 104 and the text data 116 in order to determine information 122 associated with the request represented by the text data 116. Similar to the contextual data 108, if the information component 118 (and/or another component) determines that a confidence 124 associated with that information 122 satisfies the threshold confidence, then the process 100 may include using that information 122. For a second example, the information component 118 may process the unstructured data 106 and the text data 116 in order to determine information 122 associated with the request represented by the text data 116. Similar to the contextual data 108, if the information component 118 (and/or another component) determines that a confidence 124 associated with that information 122 satisfies the threshold confidence, then the process 100 may include using that information 122.

However, in the examples above, if the information component 118 (and/or another component) again determines that the confidence 124 associated with the new information 122 still does not satisfy the threshold confidence, then the process 100 may include performing even more processing. For a first example, if the information component 118 determined that a confidence 124 associated with information 122 determined using the structured data 104 does not satisfy the threshold confidence, then the information component 118 may process the unstructured data 106 and the text data 116 in order to determine information 122 associated with the request represented by the text data 116. Similar to the contextual data 108, if the information component 118 (and/or another component) determines that a confidence 124 associated with that information 122 satisfies the threshold confidence, then the process 100 may include using that information 122. For a second example, if the information component 118 determined that a confidence 124 associated with information 122 determined using the unstructured data 106 does not satisfy the threshold confidence, then the information component 118 may process the structured data 104 and the text data 116 in order to determine information 122 associated with the request represented by the text data 116. Similar to the contextual data 108, if the information component 118 (and/or another component) determines that a confidence 124 associated with that information 122 satisfies the threshold confidence, then the process 100 may include using that information 122.

In other words, the information component 118 may initially attempt to identify the information 122 using the contextual data 108 and, if that fails, the information component 118 may attempt to identify the information 122 using the structured data 104 or the structured data 104. Additionally, if attempting to identify the information 122 using the structured data 104 or the unstructured data 106 fails, then the information component 118 may attempt to identify the information 122 using the other of the structured data 104 or the unstructured data 106.

The process 100 may include a response component 126 that is configured to process, using one or more neural networks, the text data 116 and the index data 120 (e.g., the information 122) in order to generate a response associated with the request. As described herein, the response may include text that includes at least the information 122 identified by the information component 118. For example, the response component 126 may process the text data 116 in order to determine the intent associated with the request and/or one or more slots associated with the intent. For instance, if the request is a query for information associated with an object, then the response component 126 may process the text data 116 in order to determine that the intent is requesting information. The response component 126 may also process the text data 116 to determine that first information for a first slot associated with the intent includes an identifier (e.g., a name) of an object and/or second information for a second slot associated with the intent includes the type of information being requested.

The response component 126 may also process the index data 120 to determine the information 122 being requested by the user. Additionally, the response component 126 may generate a response using the intent, the slot(s), and/or the information 122. The response component 126 may then generate and output data 128 representing the response. In some examples, the response component 126 (and/or another component) may send the output data 128 to the user device(s) 110.

Figure 5:
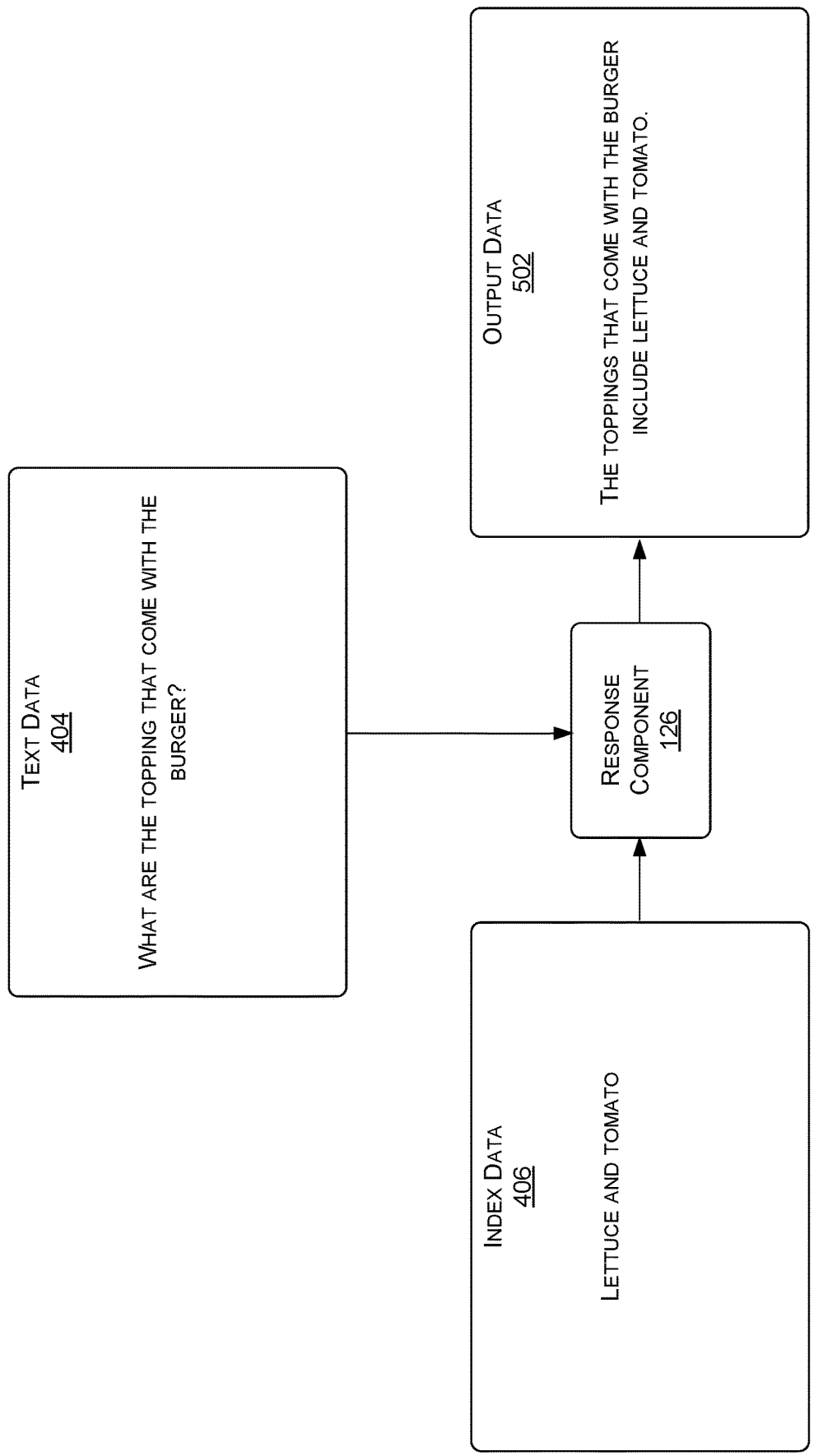
FIG. 5 illustrates an example of generating a response to a request using extracted information, in accordance with some embodiments of the present disclosure.

For instance, FIG. 5 illustrates an example of generating a response to a request using extracted information, in accordance with some embodiments of the present disclosure. As shown, the response component 126 may receive the index data 406 and the text data 404 from the example of FIG. 4. The response component 126 may then determine that the intent associated with the query is to "request information," the first slot associated with the query is "burger," and the second slot associated with the query is "toppings." The response component 126 may then use the intent, the slots, and the text from the index data 406 to generate a response represented by output data 502 (which may represent, and/or include, the output data 128). As shown by the example of FIG. 5, the response includes the text "lettuce and tomato" from the index data 406 as well as additional text to generate a full sentence.

Referring back to the example of FIG. 1, while the example of FIG. 1 illustrates each of the processing component 114, the information component 118, and the response component 126 as being separate from one another, in some examples, one or more of the processing component 114, the information component 118, and the response component 126 may be combined into a single component. For example, the processing component 114, the information component 118, and the response component 126 may be part of a dialogue management system. Additionally, the processing component 114, the information component 118, and the response component 126 may use any type of neural network(s) and/or model(s) to perform the processes described herein, such as a convolutional neural network (CNN), a feed-forward neural network, a recurrent neural network, an extractive question answering model, an answer extender model, a large language model, and/or the like.

Additionally, as described herein, in some examples, the neural network(s) used by the information component 118 may have been trained to process structured data 104 or unstructured data 106 such that the neural network(s) does not need further training in order to process the contextual data 108 (e.g., after the data is converted to a common form that the neural network(s) is trained or configured to process). For instance, the contextual data 108 may include text in a format that is similar to the text of the structured data 104 or the text of the unstructured data 106. However, in other examples, the neural network(s) may be trained using contextual data that is similar to the contextual data 108 that the neural network(s) processes in deployment.

Figure 6:
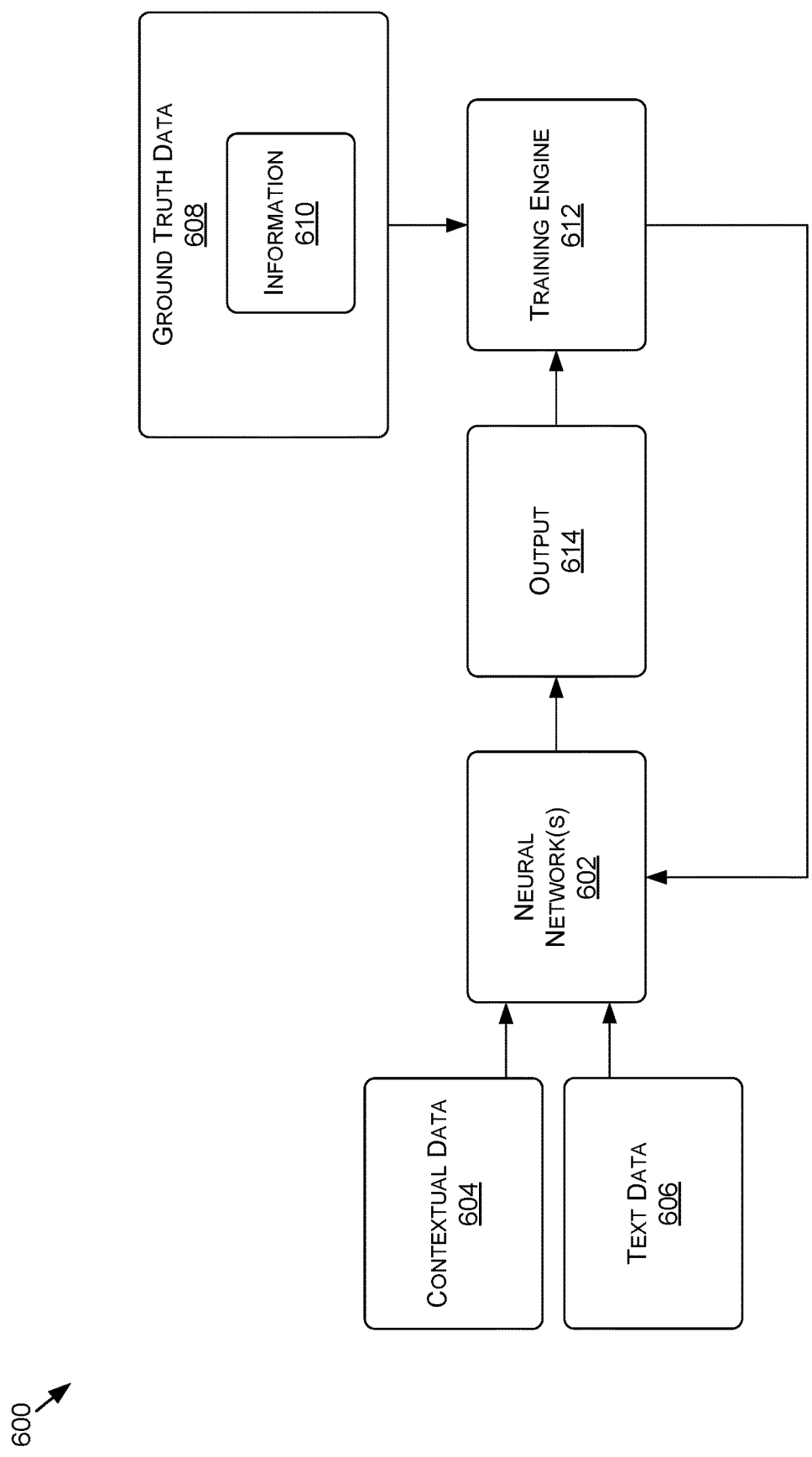
FIG. 6 is a data flow diagram illustrating a process for training a neural network(s) to extract information associated with a request, in accordance with some embodiments of the present disclosure.

For instance, FIG. 6 is a data flow diagram illustrating a process 600 for training a neural network(s) 602 to extract information associated with a request, in accordance with some embodiments of the present disclosure. As shown, the neural network(s) 602 may be trained using contextual data 604 (e.g., training contextual data) and text data 606 (e.g., training text data). The contextual data 604 may represent text in a format that is similar to the contextual data 108 generated by the contextual component 102. Additionally, the text data 606 may represent requests that are associated with the contextual data 604.

As shown, the neural network(s) 602 may be trained using the training contextual data 604, the training text data 606, and corresponding ground truth data 608. The ground truth data 608 may represent information 610 that the neural network(s) 602 should extract from the contextual data 604 based on the text data 606. The ground truth data 608 may be generated using a program suitable for generating the ground truth data 608, and/or may be human generated (e.g., by hand), in some examples. In any example, the ground truth data 608 may be synthetically produced (e.g., generated from computer models or renderings), real produced (e.g., designed and produced from real-world data), machine-automated, human annotated (e.g., labeler, or annotation expert, etc.), and/or a combination thereof. In some examples, for each request represented by the text data 606, there may be corresponding ground truth data 608.

A training engine 612 may use one or more loss functions that measure loss (e.g., error) in outputs 614 as compared to the ground truth data 608. Any type of loss function may be used, such as cross entropy loss, mean squared error, mean absolute error, mean bias error, and/or other loss function types. In some examples, different outputs 614 may have different loss functions. In some examples, backward pass computations may be performed to recursively compute gradients of the loss function(s) with respect to training parameters. In some examples, weight and biases of the neural network(s) 602 may be used to compute these gradients.

Figure 7:
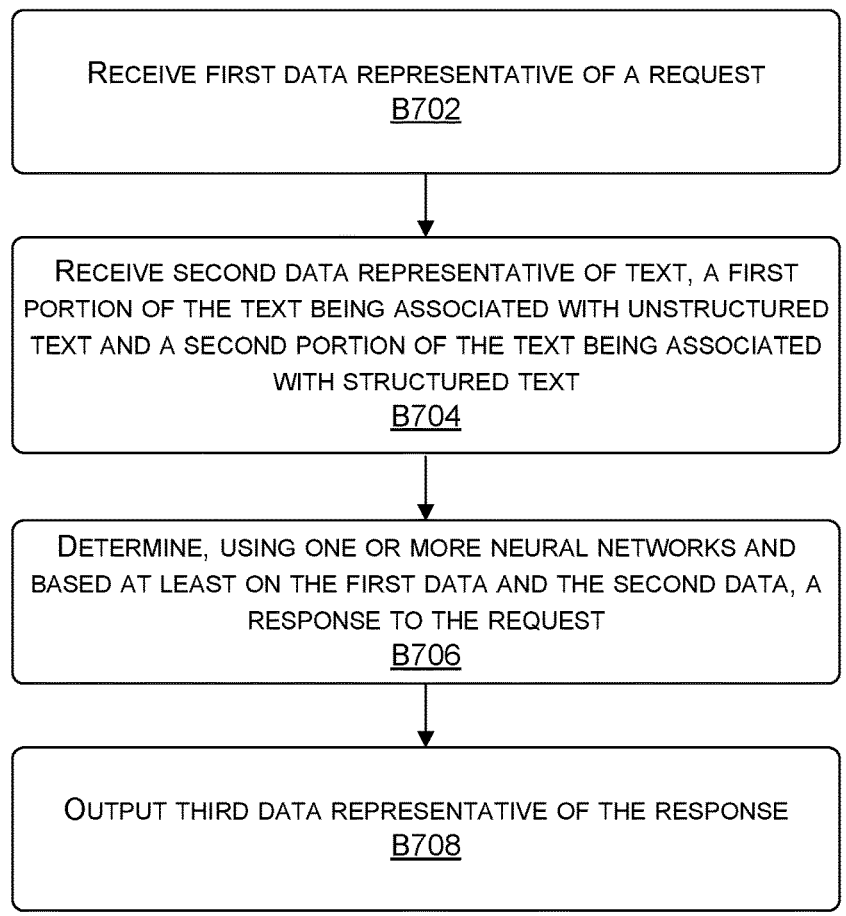
FIG. 7 is a flow diagram showing a method for processing contextual data, which is generated using structured and unstructured data, in order to determine responses to requests or queries, in accordance with some embodiments of the present disclosure.
Figure 8:
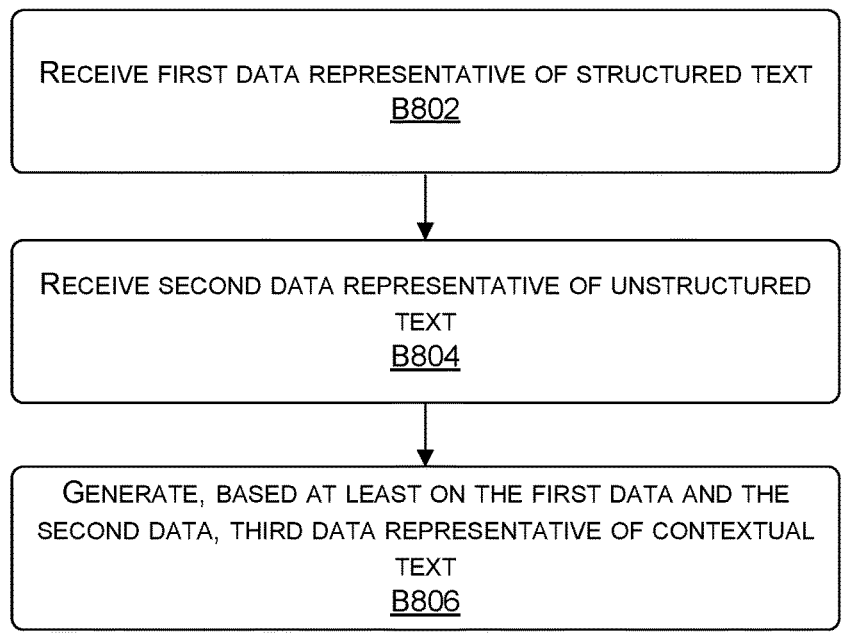
FIG. 8 is a flow diagram showing a method for generating contextual data using structured data and unstructured data, in accordance with some embodiments of the present disclosure.
Figure 9:
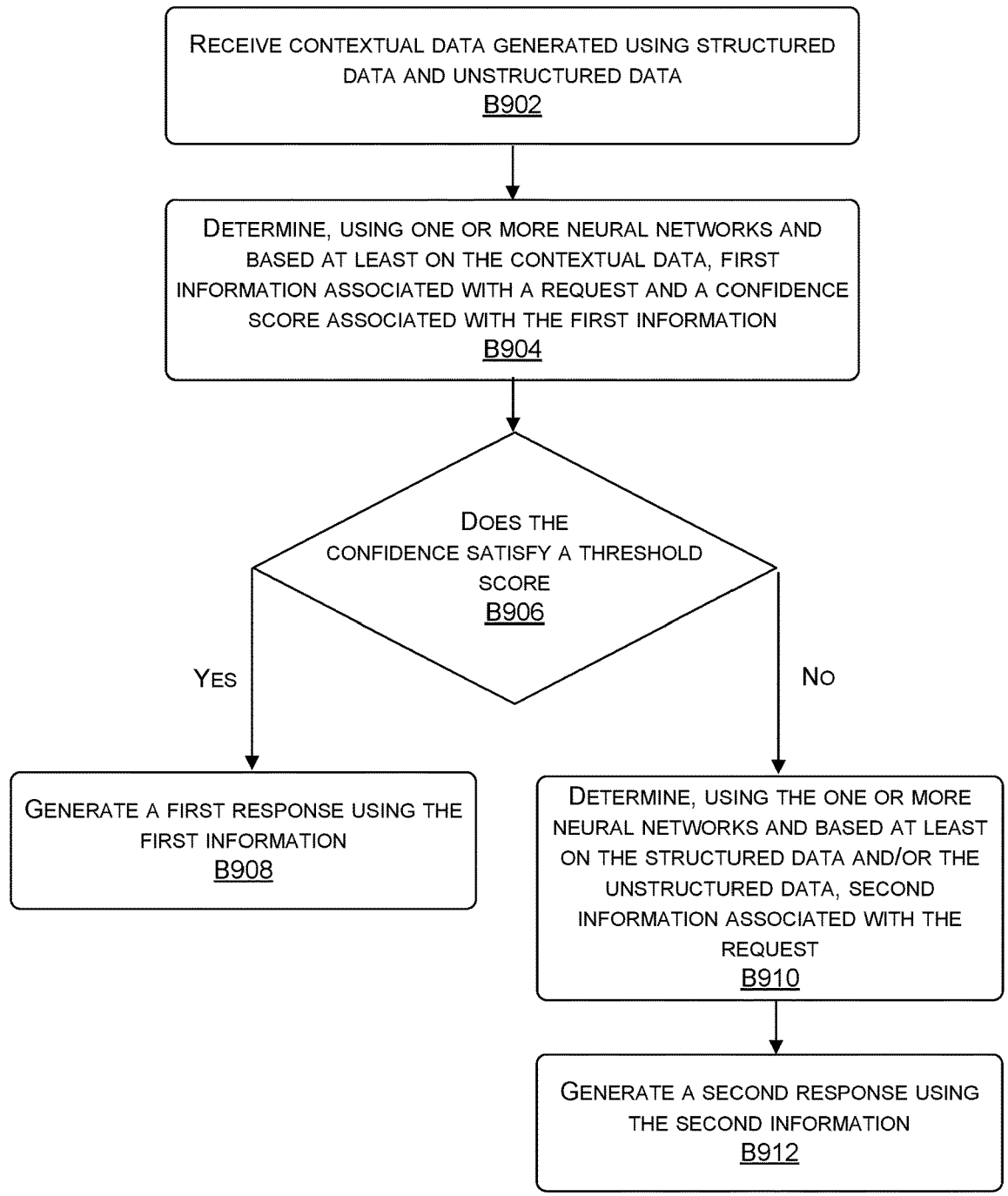
FIG. 9 is a flow diagram showing a method for generating a response associated with a request, in accordance with some embodiments of the present disclosure.

Now referring to FIG. 7-9, each block of methods, 700, 800, and 900, described herein, comprises a computing process that may be performed using any combination of hardware, firmware, and/or software. For instance, various functions may be carried out by a processor executing instructions stored in memory. The methods 700, 800, and 900 may also be embodied as computer-usable instructions stored on computer storage media. The methods 700, 800, and 900 may be provided by a standalone application, a service or hosted service (standalone or in combination with another hosted service), or a plug-in to another product, to name a few. In addition, the methods 700, 800, and 900 are described, by way of example, with respect to the system of FIG. 1. However, the methods 700, 800, and 900 may additionally or alternatively be executed by any one system, or any combination of systems, including, but not limited to, those described herein.

FIG. 7 is a flow diagram showing a method 700 for processing contextual data, which is generated using structured and unstructured data, in order to determine responses to requests or queries, in accordance with some embodiments of the present disclosure. The method 700, at block B702, may include receiving first data representative of a request. For instance, a system(s) (e.g., the information component 118) may receive the text data 116 representative of the request. As described herein, in some examples, the text data 116 may be generated based on audio data (e.g., the input data 112) received from the user device(s) 110. For example, the text data 116 may represent a transcript of user speech represented by the audio data. In some examples, the text data 116 may include text input into the user device(s) 110, such as by using an input device.

The method 700, at block B704, may include receiving second data representative of text, a first portion of the text being associated with unstructured text and a second portion of the text being associated with structured text. For instance, the system(s) (e.g., the information component 118) may receive the contextual data 108, where the contextual data 108 is generated using at least the structured data 104 and the unstructured data 106. For instance, and as described herein, the contextual data 108 may be generated using one or more first narratives that are associated with the structured data 104 and one or more second narratives that are associated with the unstructured data 106. In some examples, the text represented the contextual data 108 is in a format that is similar to the text represented by the unstructured data 106. In some examples, the text represented by the contextual data 108 is in a format that is similar to the text represented by the structured data 104.

The method 700, at block B706, may include determining, using one or more neural networks and based at least on the first data and the second data, a response to the request. For instance, the system(s) (e.g., the information component 118) may process the text data 116 and the contextual data 108 and, based on the processing, output index data 120 representing at least a portion of the text. The system(s) (e.g., the response component 126) may then process the text data 116 and the index data 120 and, based on the processing, determine a response to the request. For instance, the response may include at least the portion of the text.

The method 700, at block B708, may include outputting third data representative of the response. For instance, the system(s) (e.g., the response component 126) may then output data 128 representing the response. In some examples, the system(s) may output the data 128 by sending the data 128 to the user device(s) 110.

FIG. 8 is a flow diagram showing a method 800 for generating context data using structured data and unstructured data, in accordance with some embodiments of the present disclosure. The method 800, at block B802, may include receiving first data representative of structured data. For instance, the system(s) (e.g., the contextual component 102) may receive the structured data 104 representing the structured text associated with an intent, a topic, an action, and/or the like. As described herein, in some examples, the structured text may include fields that associate (e.g., pair) identifiers with information. For example, and for a topic, the structured text may include a first field that associates a first identifier with first information describing the first identifier, a second field that associates a second identifier with second information describing the second identifier, a third field that associates a third identifier with third information describing the third identifier, and/or so forth.

The method 800, at block B804, may include receiving second data representative of unstructured text. For instance, the system(s) (e.g., the contextual component 102) may receive the unstructured data 106 representing the unstructured text associated with the intent, the topic, the action, and/or the like. As described herein, in some examples, the unstructured text may represent one or more fields that include one or more plaintext descriptions, such as information that is not associated with a specific identifier.

The method 800, at block B806, may include generating, based at least on the first data and the second data, third data representative of contextual text. For instance, the system(s) (e.g., the contextual component 102) may generate the contextual data 108 using the structured data 104 and the unstructured data 106. In some examples, to generate the contextual data 108, the system(s) may generate one or more narratives using the structured data 104 and one or more narratives using the unstructured data 106. In some examples, the system(s) generates the narratives using a format that is similar to the text represented by the unstructured data 106. In some examples, the system(s) generates the narratives using a format that is similar to the text represented by the structured data 104. In any of the examples, the system(s) may then generate the contextual data 108 to represent a paragraph using the narratives.

FIG. 9 is a flow diagram showing a method 900 for generating a response associated with a request, in accordance with some embodiments of the present disclosure. The method 900, at block B902, may include receiving contextual data generated using structured data and unstructured data. For instance, the system(s) (e.g., the information component 118) may receive the contextual data 108, where the contextual data 108 is generated using at least the structured data 104 and the unstructured data 106. For instance, and as described herein, the contextual data 108 may be generated based on one or more narratives that are associated with the structured data 104 and one or more narratives that are associated with the unstructured data 106. In some examples, the text represented the contextual data 108 is in a format that is similar to the text represented by the unstructured data 106. In some examples, the text represented by the contextual data 108 is in a format that is similar to the text represented by the structured data 104.

The method 900, at block B904, may include determining, using one or more neural networks and based at least on the contextual data, first information associated with a request and a confidence score associated with the first information. For instance, the system(s) (e.g., the information component 118) may process the text data 116 and the contextual data 108 and, based on the processing, output index data 120 representing the first information 122 and the confidence 124 associated with the first information 122. As described herein, the first information 122 may include at least a portion of the text represented by the contextual data 108.

The method 900, at block B906, may include determining whether the confidence score satisfies a threshold score. For instance, the system(s) (e.g., the information component 118) may compare the confidence 124 to the threshold confidence score. Based on the comparison, the system(s) may determine whether the confidence 124 satisfies (e.g., is equal to or greater than) the threshold confidence score or whether the confidence 124 does not satisfy (e.g., is less than) the threshold confidence score.

If, at block B906, it is determined that the confidence score satisfies the threshold score, then the method 900, at block B908, may include generating a first response using the first information. For instance, if the system(s) determines that the confidence 124 satisfies the threshold confidence score, then the system(s) (e.g., the response component 126) may use the first information 122 to generate the first response. The system(s) may then output data 128 representing the first response.

However, if, at block B906, it is determined that the confidence score does not satisfy the threshold score, then the method 900, at block B910, may include determining, using the one or more neural networks and based at least on the structured data and/or the unstructured data, second information associated with the request. For instance, if the system(s) determines that the confidence 124 does not the threshold confidence score, then the system(s) (e.g., the information component 118) may process the text data 116 and the structured data 104 and/or the unstructured data 106 and, based on the processing, output index data 120 representing the second information 122. In some examples, the system(s) may initially use one of the structured data 104 or the unstructured data 106 to determine the second information 122. In such examples, if a confidence 124 associated with the second information 122 satisfies the threshold confidence score, then the system(s) may use the second information 122. However, if the confidence 124 associated with the second information 122 does not satisfy the threshold confidence score, then the system(s) may use the other of the structured data 104 or the unstructured data 106 to determine third information 122 associated with the request.

The method 900, at block B912, may include generating a second response using the second information. For instance, the system(s) (e.g., the response component 126) may use the second information 122 to generate the second response. The system(s) may then output data 128 representing the second response.

Example Computing Device

Figure 10:
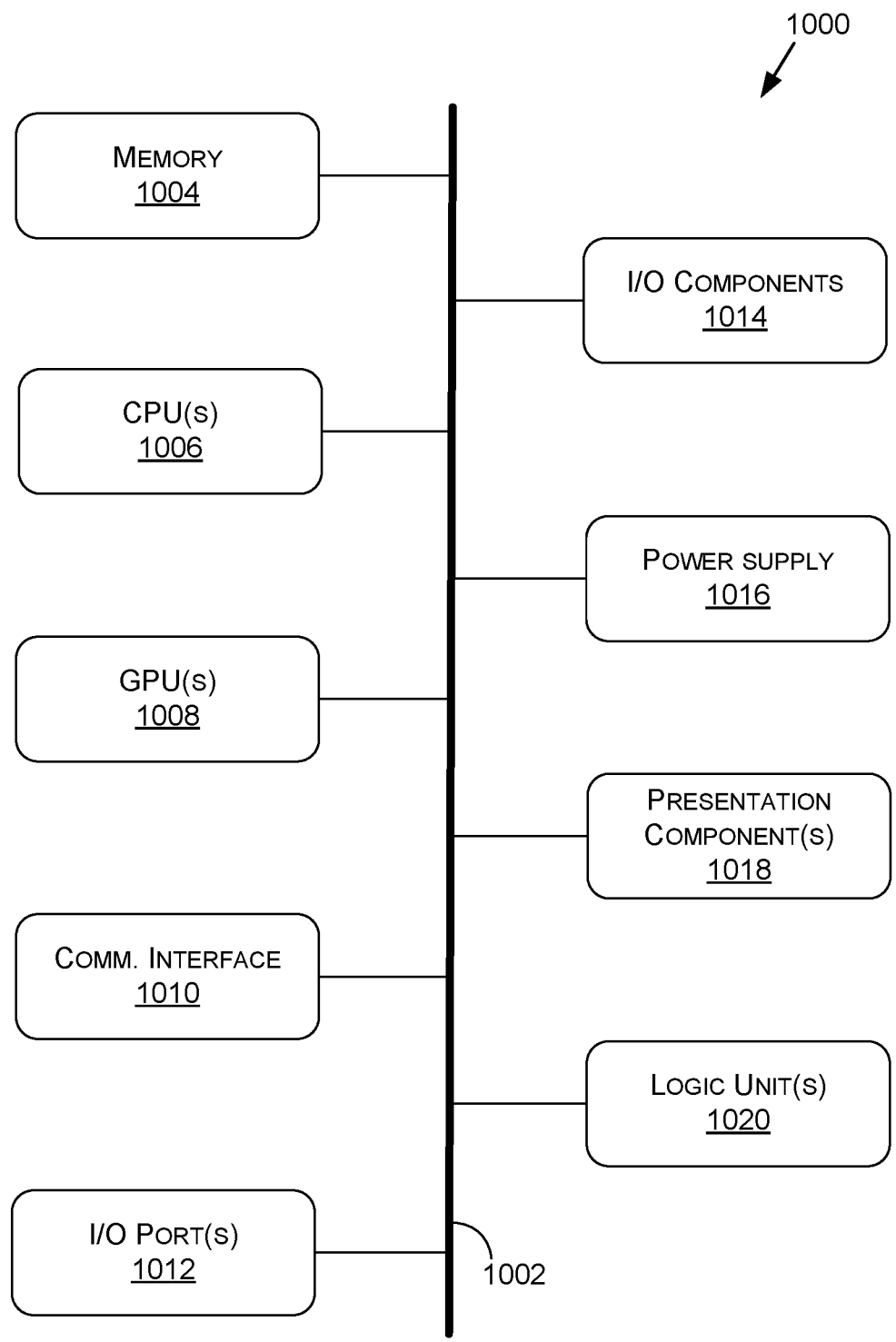
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
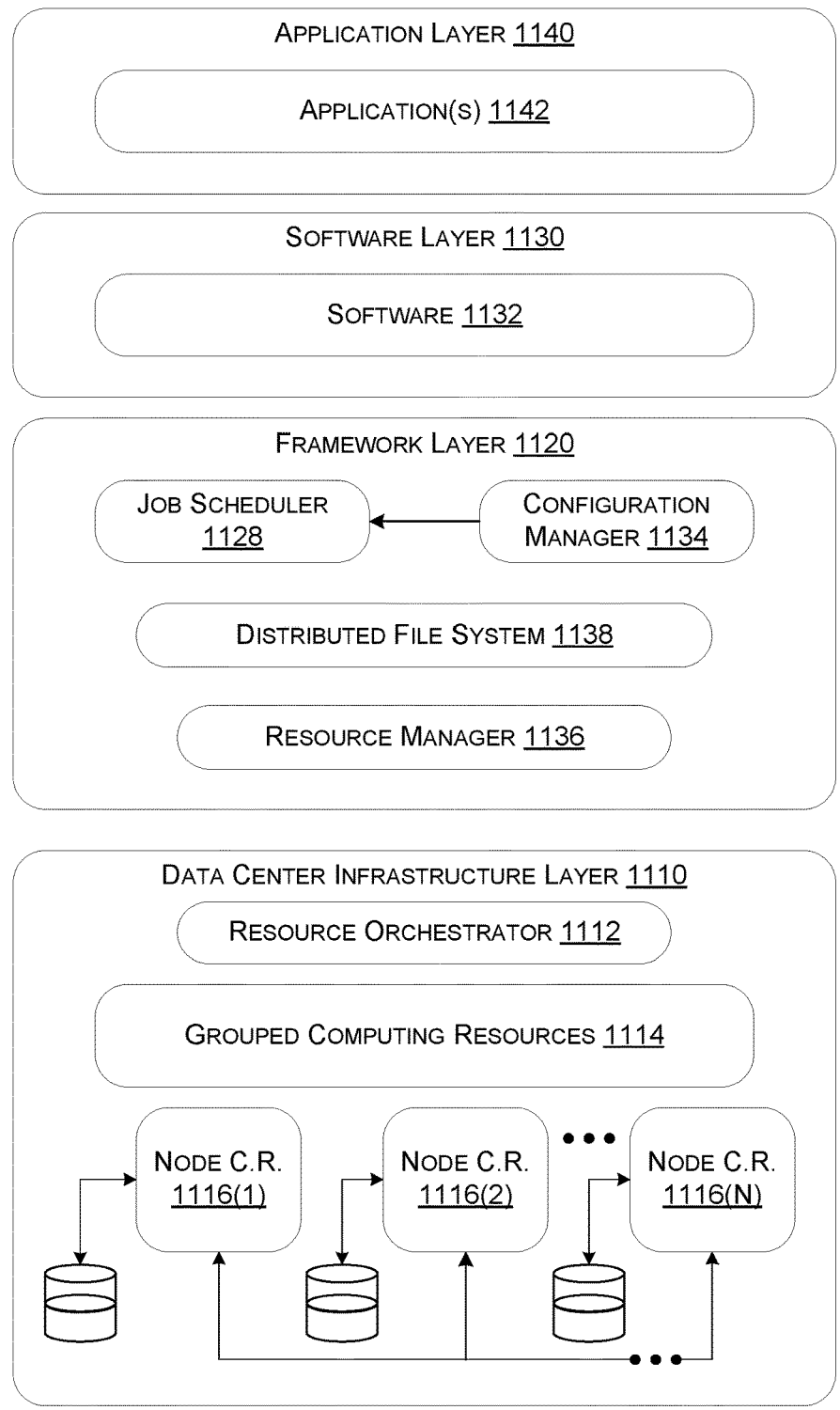
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161(N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1128, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1128 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1128. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    obtaining unstructured text that represents a plaintext description associated with a topic and structured text that associates one or more values with one or more identifiers associated with the topic;
    converting the unstructured text to one or more first narratives that include at least a portion of the plaintext description using a textual format that may be processed using one or more neural networks;
    converting the structured text to one or more second narratives that include at least a portion of the one or more values associated with the one or more identifiers using the textual format that may be processed using the one or more neural networks;
    generating contextual information associated with the topic, the contextual information including at least the one or more first narratives and the one or more second narratives;
    receiving, from a user device, first data associated with a query corresponding to the topic;
    generating, using the one or more neural networks processing first text data representative of the query and the contextual information, second text data representative of a response to the query by at least extracting one or more words from the contextual information that are related to the query, the response including at least the one or more words; and
    sending, to the user device, the second text data to be included in an output of the response.

2. The method of claim 1, wherein the generating the second text data representative of the response to the query comprises:
    determining, based at least on one or more first neural networks of the one or more neural networks processing the first text data, the one or more words extracted from the contextual information; and
    generating, using one or more second neural networks of the one or more neural networks and based at least on the one or more words, the second text data representing the response to the query.

3. The method of claim 2, further comprising:
    determining that a confidence score associated with the one or more words is equal to or greater than a threshold score,
    wherein the generating the second text data representative of response to the query is further based at least on the confidence score being equal to or greater than the threshold score.

4. The method of claim 1, wherein the obtaining of at least one of the unstructured text or the structured text is based at least on the query.

5. The method of claim 1, wherein one of:
    the textual format includes a first format that is based at least on the unstructured text; or
    the textual format includes a second format that is based at least on the structured text.

6. The method of claim 1, further comprising:
    determining, using one or more second neural networks and based at least on the first data, an intent associated with the query; and
    determining, based at least on the intent, at least one of the unstructured text or the structured text.

7. The method of claim 1, wherein the one or more second narratives include first text from the structured text and second text that causes the one or more second narratives to include the textual format.

8. The method of claim 1, wherein:
the one or more neural networks are trained to output responses associated with one or more second identifiers; and
the response includes the one or more one or more values associated with the one or more values identifiers based at least on the structured text being converted to the one or more second narratives.

9. A system comprising:
one or more processors configured to:
receive first data representative of user input;
convert, using a textual format, unstructured text that represents a plaintext description associated with a topic to one or more first narratives that include at least a portion of the plaintext description;
convert, using the textual format, structured text that associates one or more values with one or more identifiers associated with the topic to one or more second narratives that include at least a portion of the one or more values associated with the one or more identifiers;
generate contextual information that includes at least the one or more first narratives and the one or more second narratives;
generate, using one or more neural networks processing first text data representing the user input and the contextual information, second text data representative of one or more words from the contextual information that are associated with the user input; and
output second data representative of at least the one or more words.

10. The system of claim 9, wherein the one or more processors are further configured to:
determine, using one or more second neural networks and based at least on the first data and the second data, a response to the user input, the response including at least the one or more words; and
output third data representative of the response.

11. The system of claim 9, wherein the one or more processors further configured to:
receive, based at least on the user input, third data representative of the unstructured text;
receive, based at least on the user input, fourth data representative of the structured text.

12. The system of claim 9, wherein the one or more processors are further configured to:
determine, using the one or more neural networks, a confidence score associated with the one or more words;
determine that the confidence score is equal to or greater than a threshold score; and
determine, based at least on the confidence score being equal to or greater than the threshold score, to use the second data to generate a response associated with the user input.

13. The system of claim 9, wherein the one or more processors are further configured to:
determine, using the one or more neural networks, a confidence score associated with the one or more words;
determine that the confidence score is less than a threshold score; and
perform, based at least on the confidence score being less than the threshold score, further processing to generate a response associated with the user input.

14. The system of claim 13, wherein the performance of the further processing to generate the response associated with the user input comprises:
generating, using the one or more neural networks and based at least on third text data representative of the unstructured text, fourth text data representative of one or more second words from the unstructured text that are associated with the user input; and
generating the response using at least the one or more second words.

15. The system of claim 13, wherein the performance of the further processing to generate the response associated with the user input comprises:
determining, using the one or more neural networks and based at least on the first data, one or more second words from the structured text that are associated with the user input; and
generating the response using at least the one or more second words.

16. The system of claim 9, wherein the one or more processors are further configured to:
determine, using one or more second neural networks and based at least on the first data, an intent associated with the user input; and
determine, based at least on the intent, the at least one of the unstructured text or the structured text.

17. The system of claim 9, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

18. A processor comprising:
processing circuitry configured to:
convert unstructured text that represents a plaintext description associated with a topic to first text that includes at least a portion of the plaintext description;
convert structured text that associates one or more values with one or more identifiers associated with the topic to second text that includes at least the one or more values associated with the one or more identifiers, the second text including an unstructured format that is associated with the unstructured text;
generate, for a query, first text data representing contextual information that includes at least the first text and the second text;
generate, based at least on one or more neural networks processing the first text data representative of the contextual information, second text data representative of a first response associated with the query and a confidence value associated with the first response;

based at least on the confidence value, generate, based at least on the one or more neural network processing third text data representative of at least one of the unstructured text or the structured text, fourth text data representative of a second response associated with the query; and cause an output associated with the second response.

19. The processor of claim 18, wherein the processor is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

20. The processor of claim 18, wherein the generation of the second text data representative of the first response associated with the query comprises:
- generating, based at least on the one or more neural networks processing the first text data, fifth text data representing of one or more words extracted from the contextual information by the one or more neural networks, the one or more words being related to the query; and
- generating, based at least on the one or more neural networks processing at least the fifth text data, the second text data representative of the first response that includes at least the one or more words.

* * * * *